Dec. 21, 1965    P. C. GARDINER ETAL    3,225,325
RANGE GATING MEANS
Filed Oct. 4, 1950    3 Sheets-Sheet 1

INVENTORS
PAUL C. GARDINER
LAWRENCE E. JEWETT
GEORGE LUPTON BROOMELL, JR.
BY G. D. O'Brien
ATTORNEY

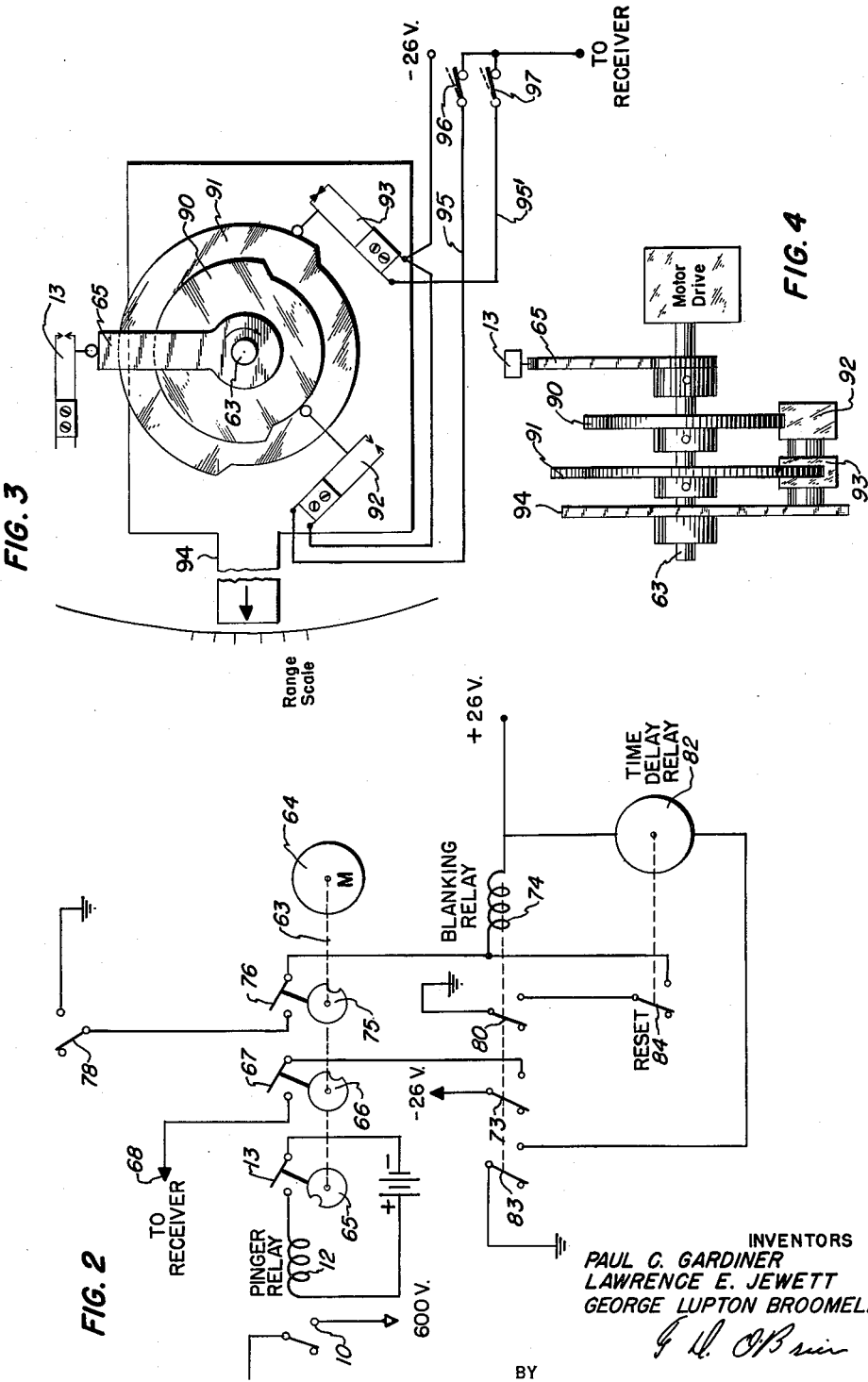

Dec. 21, 1965  P. C. GARDINER ETAL  3,225,325
RANGE GATING MEANS

Filed Oct. 4, 1950  3 Sheets-Sheet 3

INVENTORS
PAUL C. GARDINER
LAWRENCE E. JEWETT
GEORGE LUPTON BROOMELL, JR.

BY

ATTORNEYS

United States Patent Office 3,225,325
Patented Dec. 21, 1965

3,225,325
RANGE GATING MEANS
Paul C. Gardiner, Scotia, N.Y., and Lawrence E. Jewett, Springfield, and George Lupton Broomell, Jr., Lower Gwynedd Township, Montgomery County, Pa., assignors, by mesne assignments, to the United States of America as represented by the Secretary of the Navy
Filed Oct. 4, 1950, Ser. No. 188,470
1 Claim. (Cl. 340—3)

The invention relates to improvements in echo signalling systems and more specifically to improved range gating means for echo ranging equipment.

In many tyes of echo ranging equipment it is frequently desirable to prevent response to echoes returning from reflecting surfaces closer than a selected range, beyond a selected range, or outside a selected range band.

As examples, a ship with echo ranging equipment in operation against a submarine may want to avoid receiving bottom echoes from beyond the target. A submarine ranging on a group of ships may want to reject echoes returning from targets closer or beyond a given target. An echo ranging torpedo must disregard certain spurious echoes when approaching a target. Such ranging measures distance in terms of time after the ping. Gating, then, consists of blanking the receiver duirng certain parts of each cycle of operation commencing with the ping.

An important object of the invention is the provision of echo ranging equipment with means adapted, upon closing of the target range to a predetermined distance, to permanently reduce the effective range of the echo ranging equipment to said distance unless contact with the target is lost.

Another object is to provide equipment of the character above described with means for returning the range to normal in case of loss of contact with the target.

A further object is the provision of range gating apparatus with improved means for adjusting the length and timing of the interval during which echoes may be received.

A still further object is to provide echo ranging equipment with means automatically operable upon the receipt of an echo within a given listening period to blank operation of the receiver during a terminal portion of the given period and during an initial portion of the next following listening period.

Other objects and advantages of the invention will become apparent during the course of the following detailed description taken in connection with the accompanying drawings forming a part of this specification and in which drawings, FIG. 1 is an electromechanical diagrammatic view of echo controlled steering gear provided with means reducing the effective range of the equipment, upon receipt of an echo from a target, to the target range.

FIG. 2 is a fragmentary electromechanical diagrammatic view illustrating a modified form of the range reducing means shown in FIG. 1.

FIGS. 3 and 4 are side and end elevational views, respectively, of manually adjustable range gating equipment constituting a modified form of the invention.

In the drawings, similar reference characters denote corresponding parts throughout the views.

Figure 1:
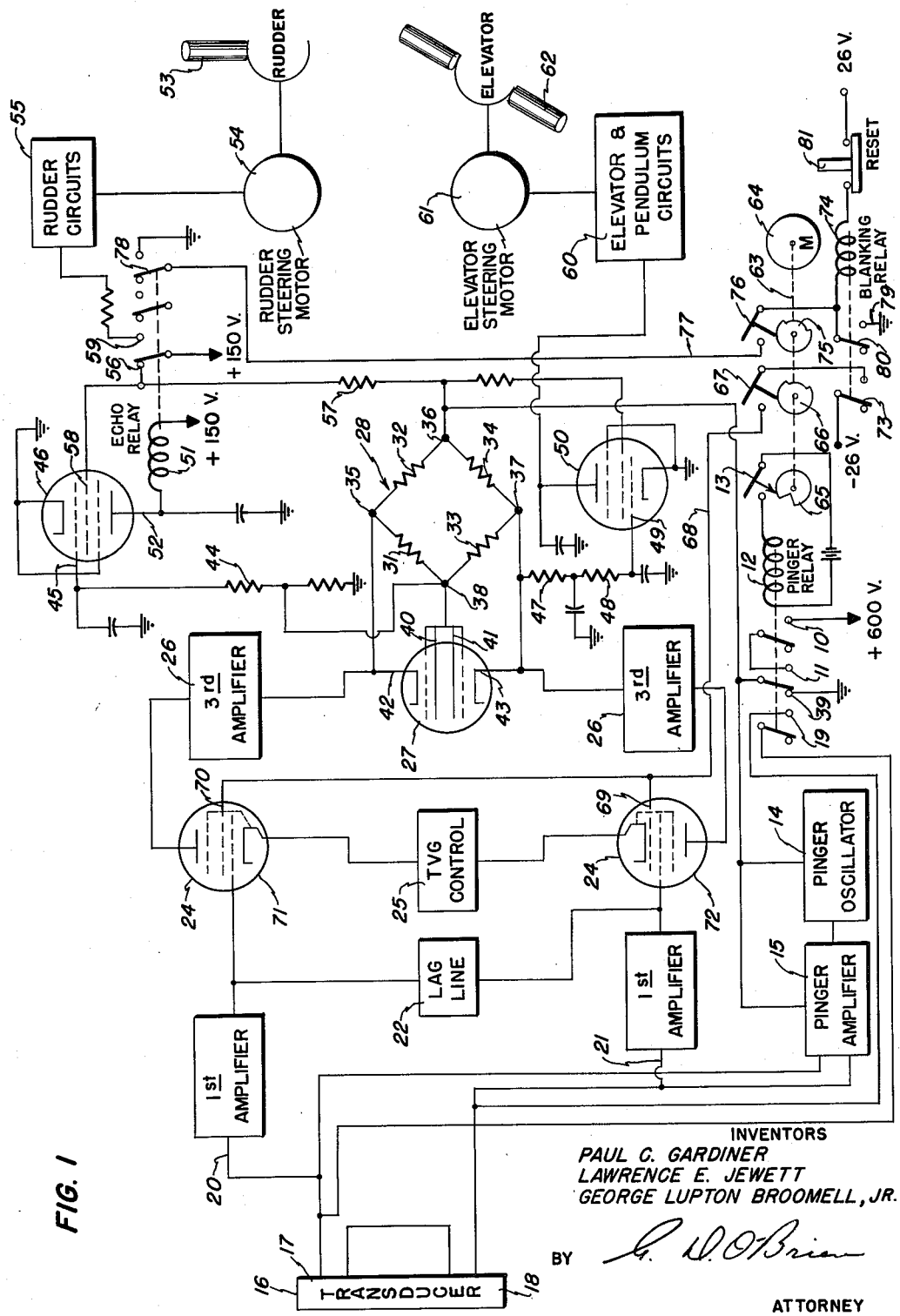

Under the control of series contacts 10, 11 of a pinger relay 12 energized upon closing of a cam-operated switch 13, pulses or pings of 60-k.c. voltage and 30-milliseconds duration are generated and amplified by a pinger oscillator 14 and amplifier 15. These pulses or pings are sent out every 0.8 second through a transducer 16 whose vertically spaced sections 17, 18 are connected in parallel during transmission by a contact 19 of the pinger relay 12. The supersonic waves leave the transducer and if there is a target present within range, are reflected back as echoes. Upon reaching the transducer, these echoes are translated into electrical input signals in dual amplifier channels 20, 21, the two parts of the transducer acting independently during reception.

If an echo returns from a target below the axis of the torpedo, the wave front will strike the lower half of the transducer first and the signal voltage generated in the lower half will lead in phase that generated in the upper half. Likewise, if the echoes are from a target above the axis of the torpedo, the signal voltage in the upper half will lead that in the lower half. This phase difference is converted into an amplitude difference by a lag line 22 following the first stage 23 of dual amplification. At the second amplifier stage 24, the overall sensitivity of the receiver is gradually increased during each reception interval by a time-variation-of-gain control 25. This control prevents false tripping of the steering control circuits on reverberation immediately following the ping and also prevents amplifier overloading on strong echo signals at close range.

The processed signals from both channels 20, 21 after a third amplification stage 26 are rectified by a twin diode 27 and applied to a comparator bridge 28 which acts as interpreter and disseminator of information necessary for correct rudder and elevator operation. This comparator bridge comprises four resistor arms 31–34 joined at corners 35–38. During reception the right corner 36 is grounded through a pinger relay contact 39. The plates 40, 41 of the twin diode 27 are each connected to the left corner 38 of the bridge, and the cathodes 42, 43 are connected one to the upper corner 35 and the other to the lower corner 37. Potential from the left corner 38 is impressed through a resistor 44 on the control grid 45 of an echo trip pentode 46. Potential from the lower corner 37 is impressed through resistors 47, 48 on the control grid 49 of an elevator pentode 50.

Normally, when no echoes are present, both the echo tube 46 and the elevator tube 50 conduct plate current and an echo relay 51 in the plate circuit 52 of the echo tube is energized. When echoes are present and the rectified channel voltages are equal, the voltage derived from the left bridge corner 38 for echo tube control is negative and equal to either channel voltage. When echoes are present and the rectified channel voltages are unequal, the voltage is equal to minus one half the sum of the two voltages, which is always negative.

The rudder 53 is thrown left or right by a reversible steering motor 54 under the control of rudder circuits 55. When echoes reach the transducer, the left corner of the bridge becomes negative regardless of the direction from which the echoes arrive, and the normally conducting echo pentode 46 is biased to cut off by the negative voltage impressed on its grid. This deenergizes the echo relay 51 and the resultant opening of its contact 56 disconnects screen voltage from the pentode causing it to remain locked out until the next ping when the pinger relay applies 600 volts through a resistor 57 to the screen grid 58. The pentode then returns to a conducting condition whereby the echo relay closes and holds itself in until the reception of another echo.

When an echo is received and the echo relay 51 opens, its contact 59 applies +150 volts to the rudder circuits 55 which then exercise steering control in response to the negative voltage signal derived from the bridge corner 38.

Depth steering is eventually controlled by a pendulum (not shown) associated with the elevator and pendulum circiuts 60. Upon receipt of an echo, the comparator bridge 28 resolves the amplitude difference between the rectified outputs of the two channels 20, 21 into either positive or negative signal voltage depending on whether the echo source is above or below the transducer. This signal voltage is impressed on the control grid 49 of the elevator tube 50 which, in conjunction with the elevator and pendulum circuits 60, a reversible elevator steering motor 62 and elevators 62, controls depth steering.

The range reducing means shown in FIG. 1 will now be described. Fixed on a shaft 63 turned at constant speed by a motor 64 is a pinger cam 65 controlling periodic closing of the pinger switch 13 for effecting operation of the transmitter during transmission periods separated by listening intervals. Also fixed on the same shaft is a timer cam 66 adapted to cause intermittent closing of a range reducing switch 67 in a receiver blanking circuit 68 adapted, when closed, to apply −26 volts to the screen grids 69, 70 of the second stage amplifier pentodes 71, 72, thereby cutting off these tubes and blanking the receiver. Serially connected in the receiver blanking circuit is a relay switch 73 closed upon energization of a blanking relay 74.

Also fixed on the pinger shaft 63 is a cam 75 adapted to cause intermittent closing of a range time switch 76 in a circuit 77 for energizing the blanking relay 74 Serially connected in the circuit 77 is a switch 78 closed upon deenergization of the echo relay 51. The blanking relay is adapted to hold itself in by means of a circuit 79 closed by relay switch arm 80. This hold-in- circuit 79 may be deenergized by opening a reset switch 81. In the operation of the range reducing system shown in FIG. 1, the blanking relay 74 is energized whenever an echo is received within a specified range for which cam 75 is designed. At the time of echo receipt, the echo relay switch 78 closes while the range selector switch 76 is closed. The hold-in switch 80 thereupon closes so as to lock in the blanking relay 74. At the same time, the blanking relay switch 73 blanks the receiver while the range reducing switch 67 is closed, that is, during the time specified by the design of cam 66. Manual resetting is acomplished by pressing the reset switch button 81 and thereby deenergizing the blanking relay 74.

FIG. 2 fragmentarily illustrates the same basic circuit shown in FIG. 1 except that a time delay relay 82 provides automatic reset action. The blanking relay 74 is energized whenever an echo is received within the range for which cam 75 is designed. Upon receipt of the echo within said range, switch 78 closes and switch 76 is maintained in its closed position by the cam 75. Upon the resultant closing of the blanking relay 74, an associated switch 83 actuates the time delay relay so as to close its switch 84 and thereby hold in the blanking relay. The time delay relay 82 is adapted to reopen automatically after a selected period. This action opens the time delay switch 84 and resets the range reducing equipment.

The simplified form of range gating equipment shown in FIGS. 3 and 4 comprises a motorized pinger shaft 63, a pinger cam 65 and a pinger switch 13 operating as in FIG. 1. Fixed on the pinger shaft 63 are cams 90, 91 adapted to close switches 92, 93 during portions of each pinger shaft revolution. These switches are mounted on a rotary plate 94 for simultaneous angular adjustment relative to the pinger shaft. The cams 90, 91 are so designed and fixed on the shaft 63 that during each revolution an interval occurs when both switches 92, 93 are open. Inasmuch as the switches 92, 93 are connected in blanking circuits 95, 95¹ that apply negative blanking voltage to the receiver, it is only during this interval that echoes may be received. Interposed in the blanking circuits 95, 95¹ are manually operable switches 96, 97 that, upon selective or simultaneous opening, permit reception of echoes returning from beyond a given range, from closer than a certain range, or without range restriction.

Figures 5, 6:
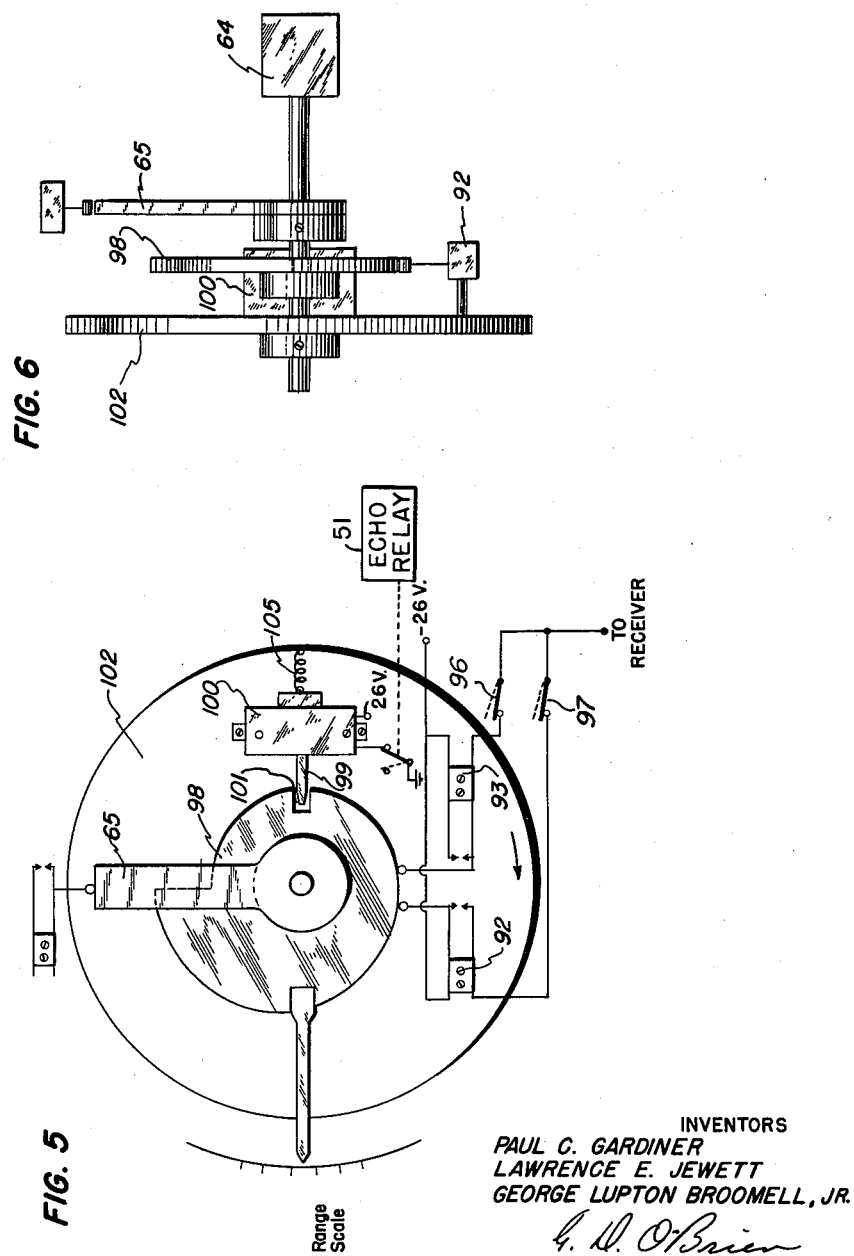
FIGS. 5 and 6 are side and end elevational views, respectively, of automatic range gating equipment forming a further modification of the invention.

Automatic range gating is performed by the equipment shown in FIGS. 5 and 6. The arrangement is basically the same as in FIGS. 3 and 4, except that the blanking cam 98 is normally driven by the motor 64 through a pin 99 urged upon energization of a a solenoid 100 into a cam notch 101. This structure connects the cam 98 for rotation with a switch-supporting plate 102 fast on the pinger shaft. When no echoes are being received, the echo relay 51 is closed as in FIG. 1, so that the solenoid 100 is energized by a 26 v. source; thus the pinger cam 65, blanking cam 98 and switch-supporting plate 102 all turn together. The blanking switches 92, 93 are both open so that reception is possible. When an echo is received, the echo relay 51 opens, the solenoid 100 is deenergized and a spring 105 disengages the pin 99 from the cam 98 which then stops rotating. Inasmuch as the plate 102 continues to turn, the switches 92, 93 move relative to the cam 98 in the direction shown by the arrow in FIG. 5. The resulting closure of the switches 92, 93 blanks the receiver until the switch plate 102 has turned almost to the position where the pin 99 will re-engage the notch 101. In this position the switches 92, 93 are open and reception is possible. If no echo is received at this point, the pin 99 re-engages and again turns the cam 98 with the switch plate 102.

If an echo is received at this point, the cam 98 will remain stationary and the blanking cycle will repeat. Since the direction of rotation is not reversible, on closing range an occasional echo is missed in order to advance the cam 98. On increasing range, the cam 98 moves in steps without missing any echoes. It is, of course, possible to drive the cam 98 backwards by any suitable means (not shown) while it is disengaged in order to eliminate skipping echoes.

It may be desirable in some instances to employ a combination of the herein-described range gating means with circuits adapted to limit range as a function of the transducer angle, depth or of both angle and depth. For example, in an application where range gating is sometimes necessary to avoid detection of echoes from the ocean bottom at a point beyond the target, the gating could be applied only when the water is shallow or the transducer angle large, or some combination of these two conditions occurs.

Various changes may be made in the forms of invention herein shown and described without departing from the spirit of the invention or the scope of the following claim.

What is claimed is:

In an echo signalling system of the character described, a transmitter for projecting wave energy, a motorized timing shaft, a circuit including a pinger switch for controlling operation of said transmitter, a pinger cam fixed on said shaft actuating said switch to effect operation of said transmitter during spaced transmission periods separated by listening intervals, a receiver adapted to translate echoes of said projected wave energy, upon reception, into electrical signals, a switch support fixed on said timing shaft, a blanking circuit including a switch carried by said support, a blanking cam adapted upon synchronization with said timing shaft to actuate said blanking switch so as to blank operation of said receiver for a portion of each listening interval, and means synchronizing said blanking cam with said timing shaft upon the receipt of an echo by said receiver.

References Cited by the Examiner

UNITED STATES PATENTS

| | | | |
|---|---|---|---|
| 2,403,527 | 7/1946 | Hershberger | 343—13 |
| 2,409,632 | 10/1946 | King | 114—23 |
| 2,415,119 | 2/1947 | Wellenstein | 177—352.6 |
| 2,433,667 | 12/1947 | Hollingsworth | 343—13 |
| 2,566,858 | 9/1951 | Sebring | 340—3 |

CHESTER L. JUSTUS, *Primary Examiner.*

JAMES L. BREWRINK, NORMAN H. EVANS,
*Examiners.*

J. R. SPALLA, *Assistant Examiner.*